(12) United States Patent
De Mers et al.

(10) Patent No.: US 12,248,144 B1
(45) Date of Patent: Mar. 11, 2025

(54) DISPLAY SYSTEM AND METHOD FOR REDUCING MOTION SICKNESS

(71) Applicant: HONEYWELL INTERNATIONAL INC., Charlotte, NC (US)

(72) Inventors: Robert De Mers, Plymouth, MN (US); Tor Finseth, Plymouth, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/503,697

(22) Filed: Nov. 7, 2023

(51) Int. Cl.
*G02B 27/00* (2006.01)
*G02B 27/01* (2006.01)

(52) U.S. Cl.
CPC ....... *G02B 27/0093* (2013.01); *G02B 27/017* (2013.01)

(58) Field of Classification Search
CPC .................. G02B 27/0093; G02B 27/017
See application file for complete search history.

(56) References Cited

U.S. PATENT DOCUMENTS

| | | | |
|---|---|---|---|
| 5,218,355 A | 6/1993 | Burkhardt | |
| 5,966,680 A * | 10/1999 | Butnaru | G02B 27/017 |
| | | | 702/150 |
| 6,702,229 B2 | 3/2004 | Anderson et al. | |
| 7,724,155 B1 | 5/2010 | Anderson et al. | |
| 8,690,750 B2 * | 4/2014 | Krueger | A61B 5/1114 |
| | | | 600/27 |
| 9,080,868 B2 * | 7/2015 | Krueger | G01C 9/10 |
| 9,540,116 B1 | 1/2017 | Barber | |
| 9,994,228 B2 * | 6/2018 | Krueger | A61B 5/02055 |
| 10,558,043 B2 * | 2/2020 | Bull | G02B 27/0172 |
| 10,586,514 B2 * | 3/2020 | Shatzki | G06F 3/013 |
| 11,004,425 B2 * | 5/2021 | Shatzki | B60K 35/29 |
| 11,960,091 B2 * | 4/2024 | Arngren | G02B 27/0172 |
| 2015/0273179 A1 * | 10/2015 | Krueger | G02C 11/00 |
| | | | 600/27 |
| 2023/0019068 A1 * | 1/2023 | Assländer | A61B 5/1116 |

FOREIGN PATENT DOCUMENTS

EP 330147 A2 8/1989
FR 3055459 A1 3/2018

* cited by examiner

*Primary Examiner* — Vinh T Lam
(74) *Attorney, Agent, or Firm* — Lorenz & Kopf LLP

(57) ABSTRACT

A display system includes a display device and a processing system. The display device includes at least one display region. The processing system receives motion data indicative of relative motion between the display device and images, viewed by a user, on or through the at least one display region. The processing system supplies visual cue commands that cause only a first visual cue to be generated on or adjacent to the left peripheral side and only a second visual cue to be generated on or adjacent to the right peripheral side or only the first visual cue to be generated on or adjacent to the top peripheral side and only the second visual cue to be generated on or adjacent to the bottom peripheral side, and to selectively vary either the positions of the first and second visual cues, or the positions of the first and second visual cues.

20 Claims, 11 Drawing Sheets

DISPLAY SYSTEM AND METHOD FOR REDUCING MOTION SICKNESS

TECHNICAL FIELD

The present disclosure generally relates to display systems and methods and, more particularly, relates to a display system and method for reducing the incidence of motion sickness.

BACKGROUND

There are certain contexts in which persons are required to interact with relatively large, immersive displays, while disposed within a moving vehicle, such as an aircraft, watercraft, or various types of terrestrial vehicles. As the vehicle moves, such persons can be subject to a high incidence of motion sickness. This can lead to various undesirable outcomes. For example, the person may need to switch to the use of a smaller, less immersive (and less effective) display. In some instances, the person may need to take frequent breaks from their work in order to regain their composure, or even be unable to carry out their task altogether. Of course, for some persons, motion sickness can also occur even when they are not in a vehicle, and no matter what size or type of display they are interacting with, and even when they are not interacting with a display.

One technique that has been used to alleviate the incidence of motion sickness is to provide peripheral vision cues in glasses that have round, half-fluid-filled frames, in which the moving fluid provides an artificial horizon line. This technique has several drawbacks. In particular, besides being unattractive, the glasses interfere with prescription eyewear and, in some contexts, with headsets or helmets. In addition, this configuration is intrusive on the operator, and can result in lost, broken, and/or misplaced glasses.

Hence, there is a need for a display system and method that reduces the incidence of motion sickness and that does not rely on a moving fluid (or other visual cue) to provide a horizon cue on the display, and therefore provides a non-intrusive, natural sense of the position of the horizon. The present disclosure addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

The system and method disclosed herein reduces the incidence of motion sickness by introducing peripheral vision cues on the edges of a display. This provides the operator with a non-intrusive, natural sense of the position of the horizon.

In one embodiment, a display system includes a display device and a processing system. The display device includes at least one display region, and the at least one display region has an outer peripheral region that includes at least a left peripheral side, a right peripheral side, a top peripheral side, a bottom peripheral side. The processing system is in operable communication with the display device and is adapted to receive motion data from a motion data source. The motion data is indicative of relative motion between the display device and images, viewed by a user, on or through the at least one display region. The processing system is configured to supply visual cue commands that cause either (1) only a first visual cue to be generated at a first position on or adjacent to the left peripheral side and only a second visual cue to be generated at a second position on or adjacent to the right peripheral side or (2) only the first visual cue to be generated at a third position on or adjacent to the top peripheral side and only the second visual cue to be generated at a fourth position on or adjacent to the bottom peripheral side, and, based on the motion data, selectively vary either (1) the first and second positions of the first and second visual cues, respectively, or the third and fourth positions of the first and second visual cues, respectively.

In another embodiment, a display system includes a display device, a motion data source, and a processing system. The display device includes at least one display region, and the at least one display region has an outer peripheral region that includes at least a left peripheral side, a right peripheral side, a top peripheral side, a bottom peripheral side. The motion data source is configured to (i) sense relative motion between the display device and images, viewed by a user, on or through the at least one display region and (ii) supply motion data indicative of the relative motion. The processing system is in operable communication with the display device and the motion data source. The processing system is configured to supply visual cue commands that cause either (1) only a first visual cue to be generated at a first position on or adjacent to the left peripheral side and only a second visual cue to be generated at a second position on or adjacent to the right peripheral side or (2) only the first visual cue to be generated at a third position on or adjacent to the top peripheral side and only the second visual cue to be generated at a fourth position on or adjacent to the bottom peripheral side, and based on the motion data, selectively vary either (1) the first and second positions of the first and second visual cues, respectively, or the third and fourth positions of the first and second visual cues, respectively.

In yet another embodiment, a method for reducing motion sickness using a display system that includes a display device having at least one display region that includes an outer peripheral region, the outer peripheral region including at least a left peripheral side, a right peripheral side, a top peripheral side, a bottom peripheral side includes supplying, from a processing system, visual cue commands that cause either (1) only a first visual cue to be generated at a first position on or adjacent to the left peripheral side and only a second visual cue to be generated at a second position on or adjacent to the right peripheral side or (2) only the first visual cue to be generated at a third position on or adjacent to the top peripheral side and only the second visual cue to be generated at a fourth position on or adjacent to the bottom peripheral side. Motion data indicative of relative motion between the display device and images, viewed by a user, on or through the at least one display region is supplied to the processing system. The motion data is processed in the processing system to thereby selectively vary either the first and second positions of the first and second visual cues, respectively, or the third and fourth positions of the first and second visual cues, respectively.

Furthermore, other desirable features and characteristics of the display system and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
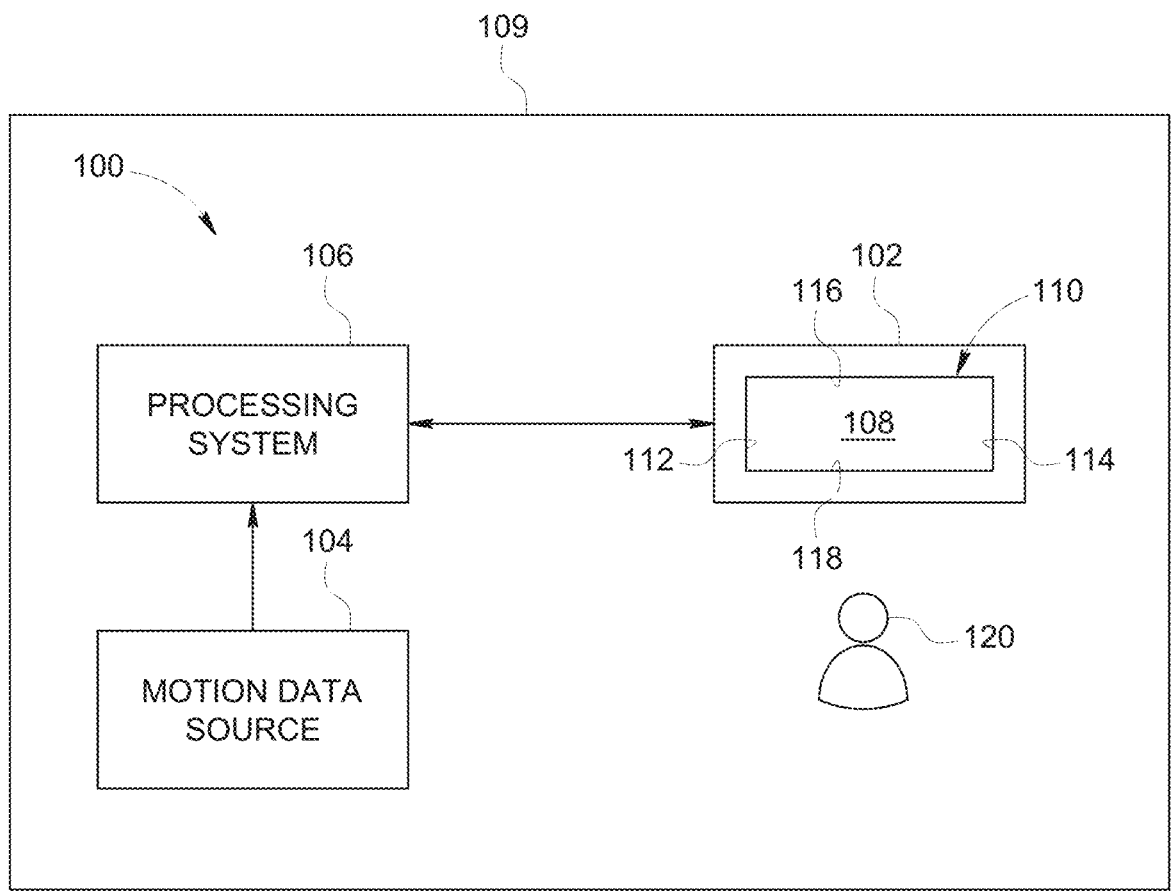
FIG. 1 depicts a functional block diagram of one embodiment of a display system.

Referring now to FIG. 1, a functional block diagram of one embodiment of a display system 100 is depicted. The display system 100, which is configured to reduce motion sickness, includes a display device 102, a motion data source 104, and a processing system 106. In the depicted embodiment, the display system 100 is disposed within a vehicle 109, such as a land-based vehicle, an aerial vehicle, a space vehicle, or a waterborne vehicle. In other embodiments, however, the display system may be disposed solely on a user 120 of the display system 100, who may or may not be disposed on or within the vehicle 109.

The display device 102 includes a display region 108, which includes an outer peripheral region 110. The outer peripheral region 110 includes at least a left peripheral side 112, a right peripheral side 114, a top peripheral side 116, and a bottom peripheral side 118. It will be appreciated that the display device 102 may be implemented using any one of numerous known types of display devices. Some non-limiting examples include various types of flat or curved panel display devices and various types of wearable display devices including for example, various types of near-to-eye (NTE) display devices and various types of virtual reality (VR) headsets.

Figure 2:
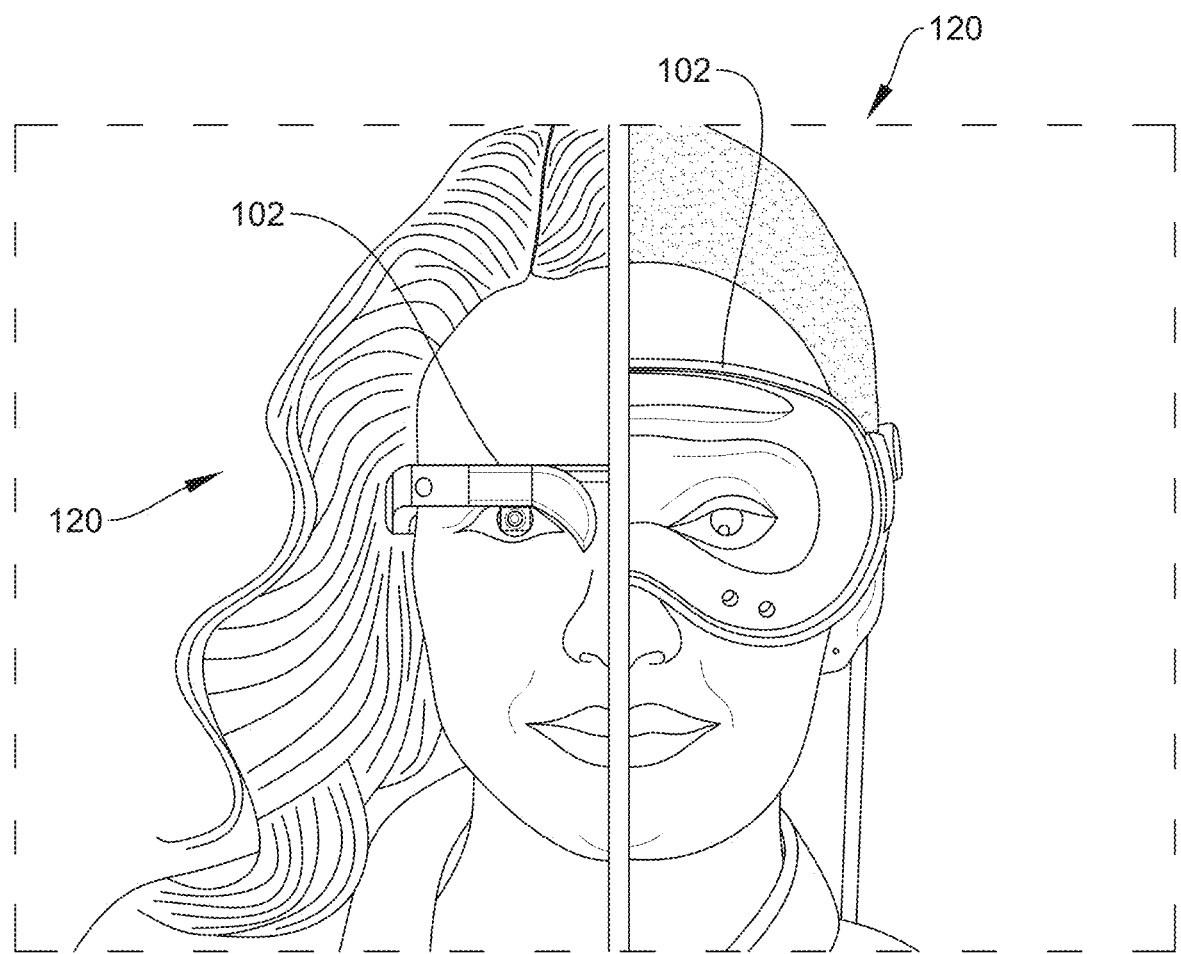
FIG. 2 depicts two different example embodiments of wearable display devices that may be implemented in the example system of FIG. 1.

Regardless of the specific type, the display device 102 is coupled to receive image rendering display commands and is configured, upon receipt of the image rendering display commands, to display one or more images on the display region 108. It will be appreciated, however, that there may be times when the display device 102 is not receiving any image rendering display commands and thus the display region 108 will not have one or more images rendered thereon. As will be explained further below, when the display region 108 is not rendering one or more images, there is still a potential for the user 120 to experience motion sickness. Most notably, when the display device 102 is a certain type of wearable display device, such as the non-limiting example see-through display devices 102 depicted in FIG. 2.

The motion data source 104 is configured to sense relative motion between the display device 102 and the images that are viewed by the user 120. These images, as alluded to above, may be images rendered on, or viewed through, the display region 108. In either case, the motion data source 104 is additionally configured to supply motion data indicative of the sensed relative motion between the display device 102 and the images. It will be appreciated that the motion of the display device 102 refers to motion caused by the vehicle 109 (when the display system 100 is disposed within the vehicle 109) and/or movement of the user 120, and motion of the images refers to any type of motion occurring on (or through) the display region 108. It will additionally be appreciated that the motion data source 104 may be implemented using any one of numerous types of sensor devices/systems capable of detecting this type of motion. Some non-limiting examples of suitable sensor devices/systems include accelerometers, attitude sensors, and motion sensors, such as an inertial measurement unit (IMU), just to name a few. In some embodiments, motion data source 104 may additionally include a camera disposed on or within the display device 102 to provide increased accuracy.

The processing system 106 generally represents the hardware, circuitry, processing logic, and/or other components configured to facilitate operation of the display system 100 and perform additional processes, tasks and/or functions to support operation of the display system 100, as described in greater detail below. Depending on the embodiment, the processing system 106 may be implemented or realized with a general-purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein.

In practice, the processing system 106 includes processing logic that may be configured to carry out the functions, techniques, and processing tasks associated with the operation of the display system 100 described in greater detail below. Furthermore, the steps of a method or algorithm described in connection with the embodiments disclosed herein may be embodied directly in hardware, in firmware, in a software module executed by the processing system 106, or in any practical combination thereof. In accordance with one or more embodiments, the processing system 106 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 106, cause the processing system 106 to execute and perform one or more of the processes, tasks, operations, and/or functions described herein.

Figure 3:
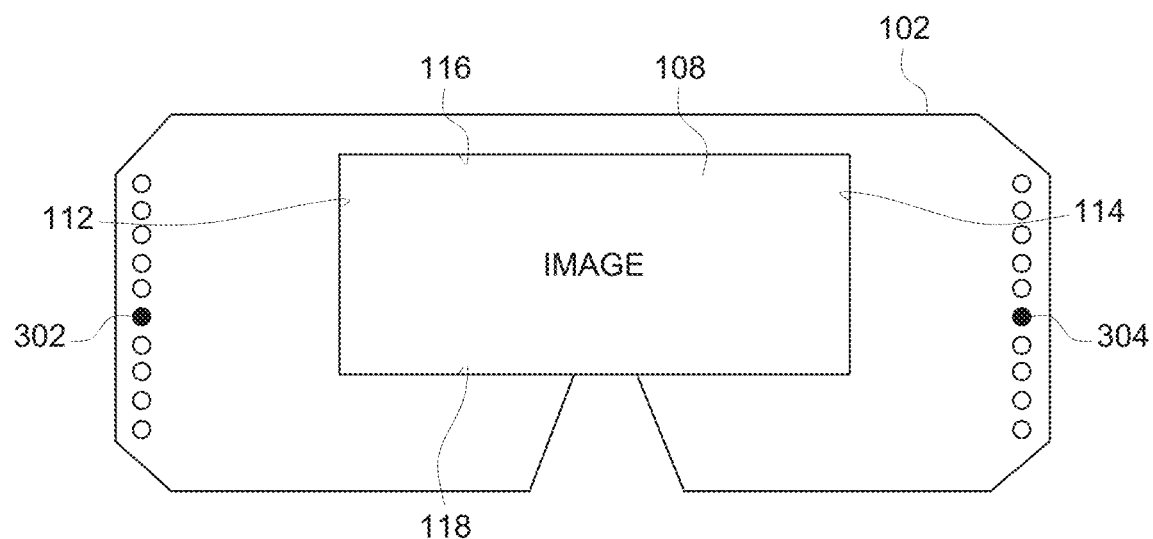
FIGS. 3 and 4 depict simplified representations of a wearable display device having first and second visual cues adjacent the device display region.

With the above in mind, it is noted that the processing system 106 is in operable communication with the display device 102 and the motion data source 104. The processing system 106 is configured to selectively supply the image rendering display commands to the display device 102. The processing system 106 is also configured to supply visual cue commands. The visual cue commands supplied by the processing system 106 cause first and second visual cues, and only the first and second visual cues (i.e., no other graphics, such as a horizon line, interconnecting the visual cues), to be generated. More specifically, and as FIG. 3 depicts, in one embodiment, only a first visual cue 302 will be generated at a first position on or adjacent to the left peripheral side 112 and only a second visual cue 304 will be generated at a second position on or adjacent to the right peripheral side 114. Or, as FIG. 4 depicts, only the first visual cue 302 will be generated at a third position on or adjacent to the top peripheral side 116 and only the second visual cue 304 will be generated at a fourth position on or adjacent to the bottom peripheral side 118.

Figure 5:
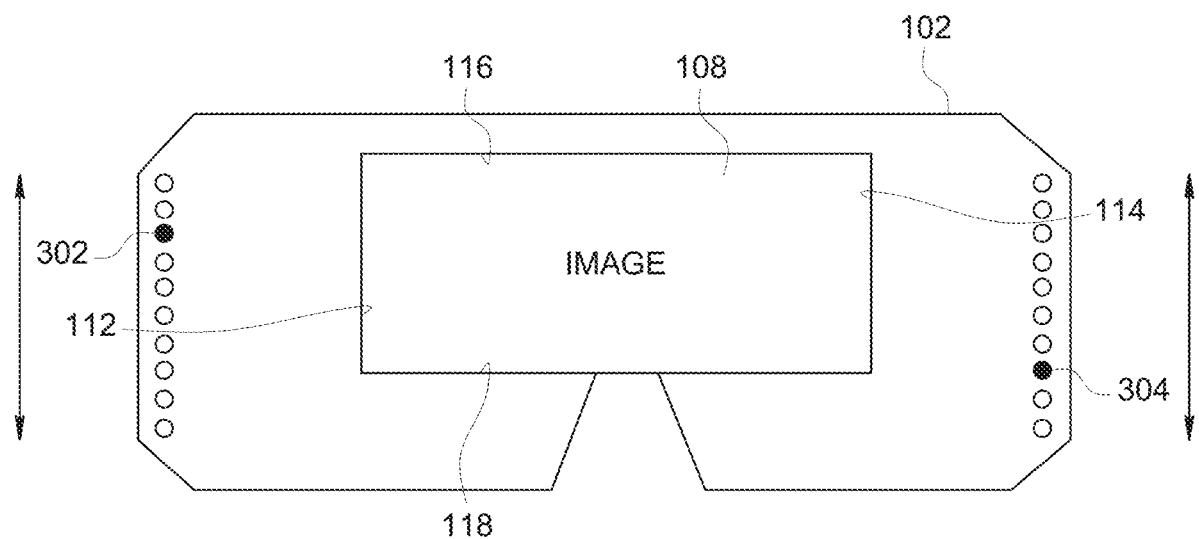
FIGS. 5 and 6 depict the simplified representations of the wearable display devices depicted in FIGS. 3 and 4, respectively, showing one example of how the positions of the first and second visual cues may vary.

The processing system 106 is additionally coupled to receive the motion data from the motion data source 104 and is configured to process the motion data. The processing system 106, in response to processing the motion data, is further configured to selectively vary either the first and second positions of the first and second visual cues 302, 304, respectively (see FIG. 5), or the third and fourth positions of the first and second visual cues 302, 304, respectively (see FIG. 6). As may be appreciated, selectively varying the positions of the first and second visual cues 302, 304 creates a moving indicator to match the real-world horizon, thereby reducing the likelihood of motion sickness of the user 120.

Figure 4:
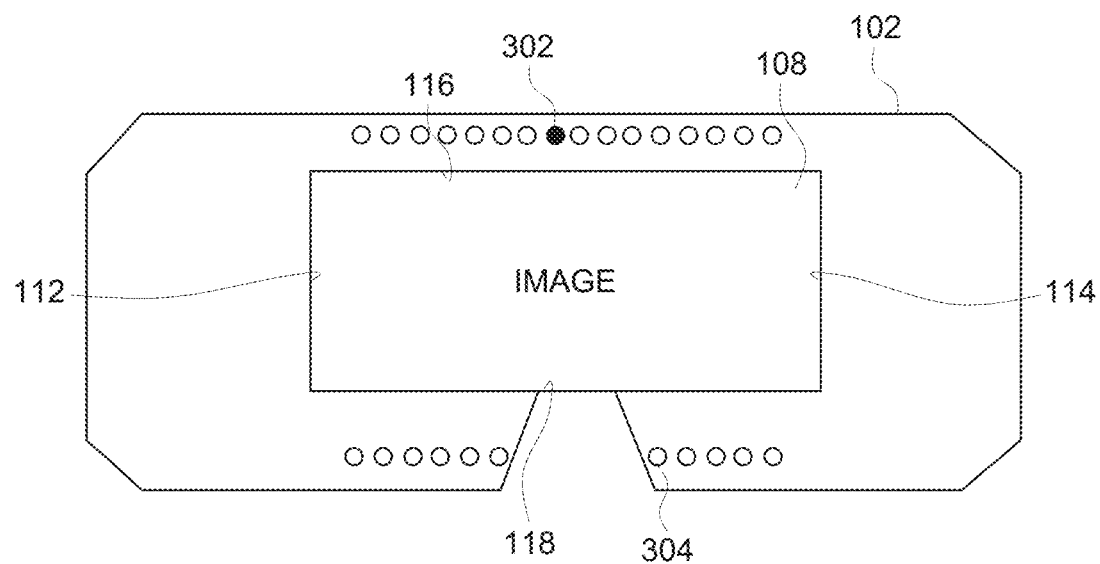
Figure 6:
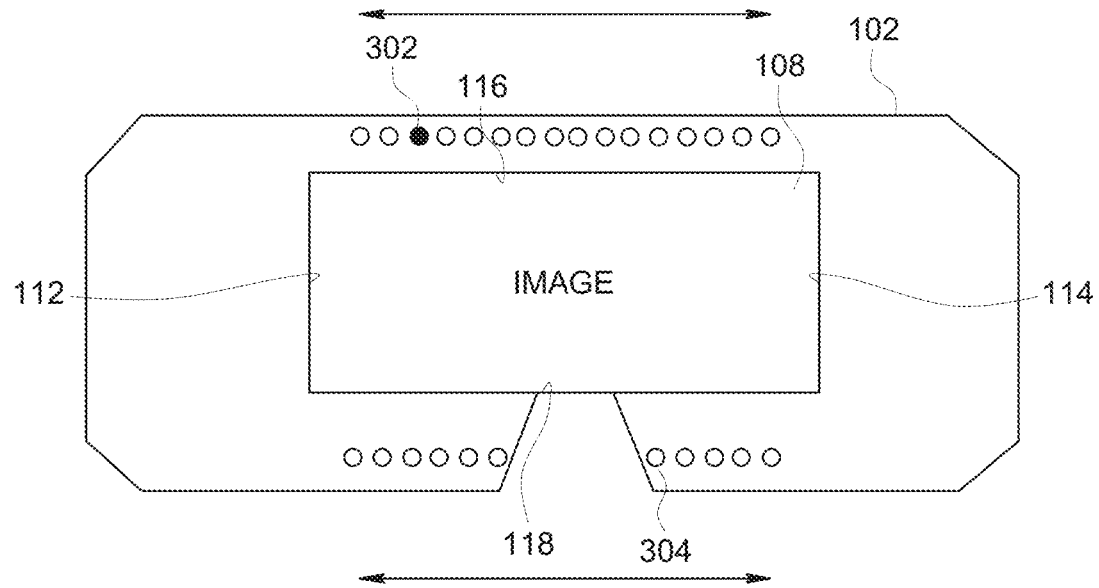
Figure 7:
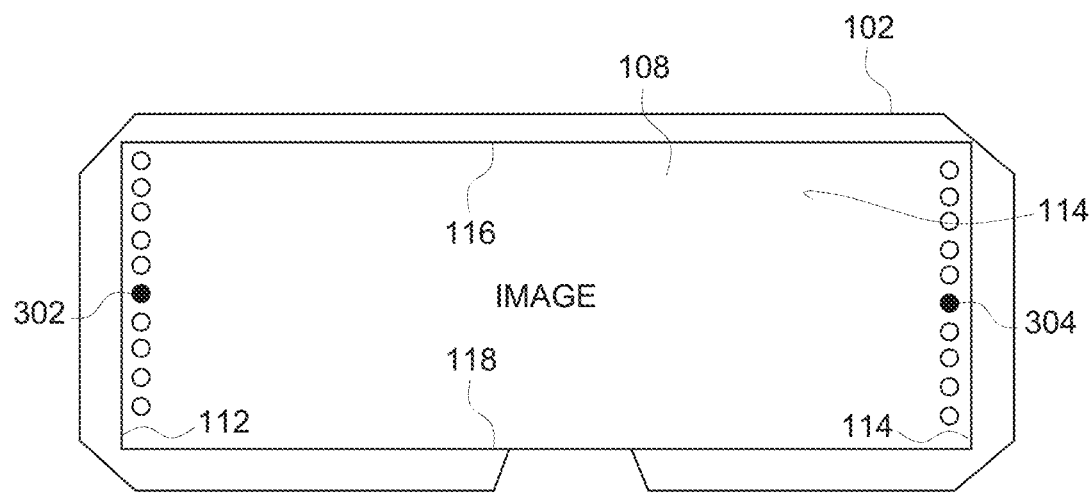
FIGS. 7-12 depict simplified representations of example display devices having the first and second visual cues rendered on the device display region.

In some embodiments, such as the ones depicted in FIGS. 3-6, the first and second visual cues 302, 304 are disposed on the display device 102 adjacent to the left peripheral side 112 and right peripheral side 114, respectively (FIGS. 3 and 5), or on the display device 102 adjacent to the top peripheral side 116 and the bottom peripheral side 118, respectively (FIGS. 4 and 6). In these embodiments, the first and second visual cues 302, 304 may each comprise, for example, a plurality of LEDs that are individually and selectively energized.

Figure 8:
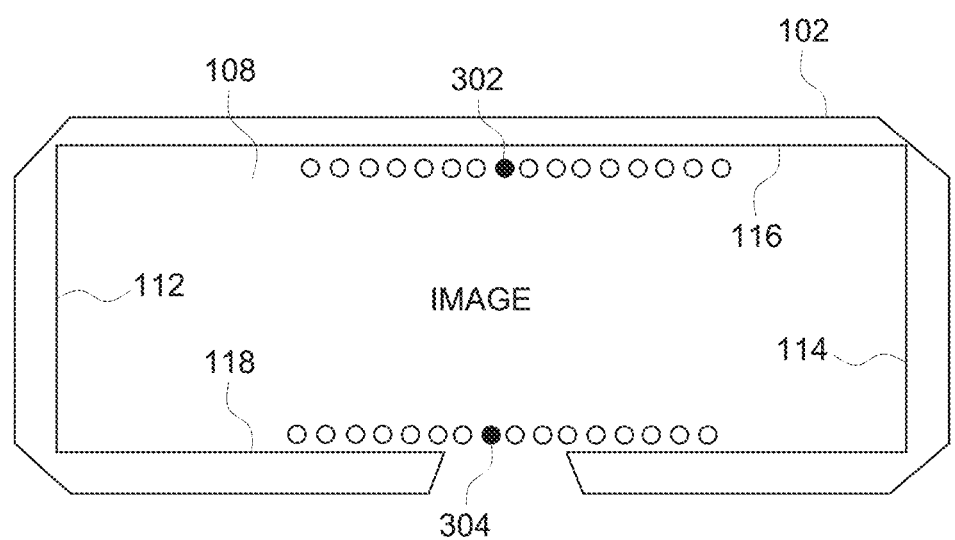
Figure 9:
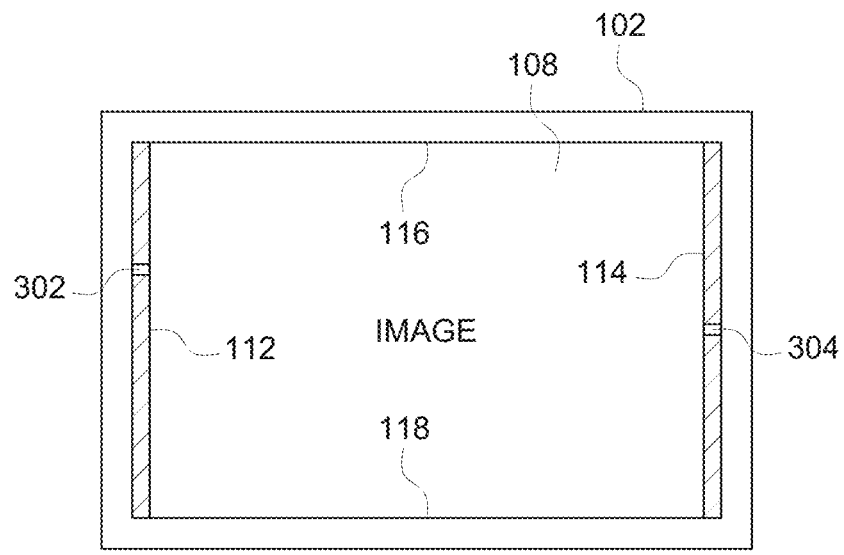
Figure 10:
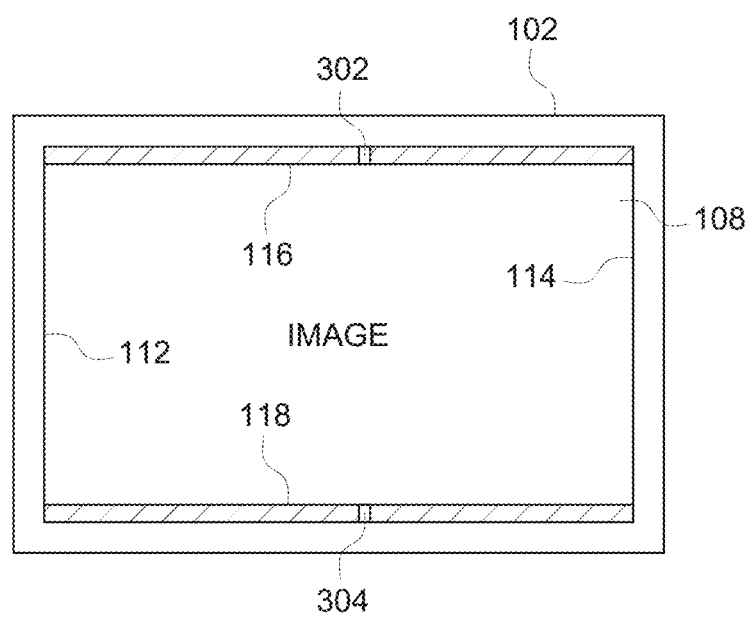
Figure 11:
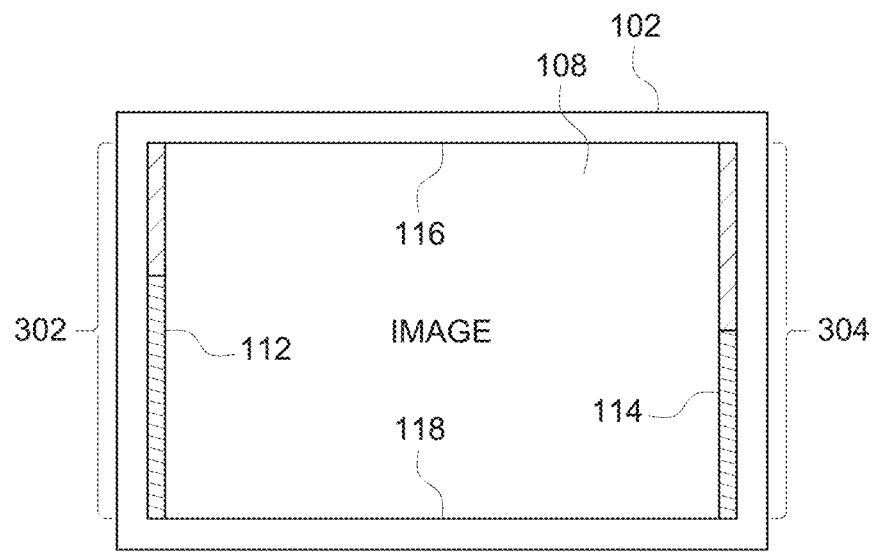
Figure 12:
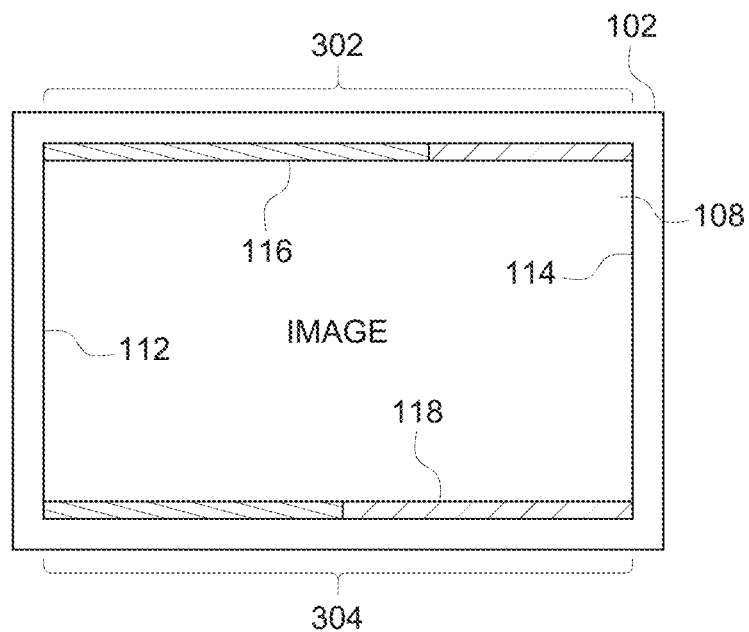

In other embodiments, such as the ones depicted in FIGS. 7-12, the first and second visual cues 302, 304 are rendered on the left peripheral side 112 and right peripheral side 114, respectively (FIGS. 7, 9, and 11), or on the top peripheral side 116 and the bottom peripheral side 118, respectively (FIGS. 8, 10, and 12). In these embodiments, the first and second visual cues 302, 304 may each comprise, for example, graphically generated dots (FIGS. 7 and 8), a single graphic (FIGS. 9 and 10), or a multi-colored stripe (FIGS. 11 and 12).

Figure 13:
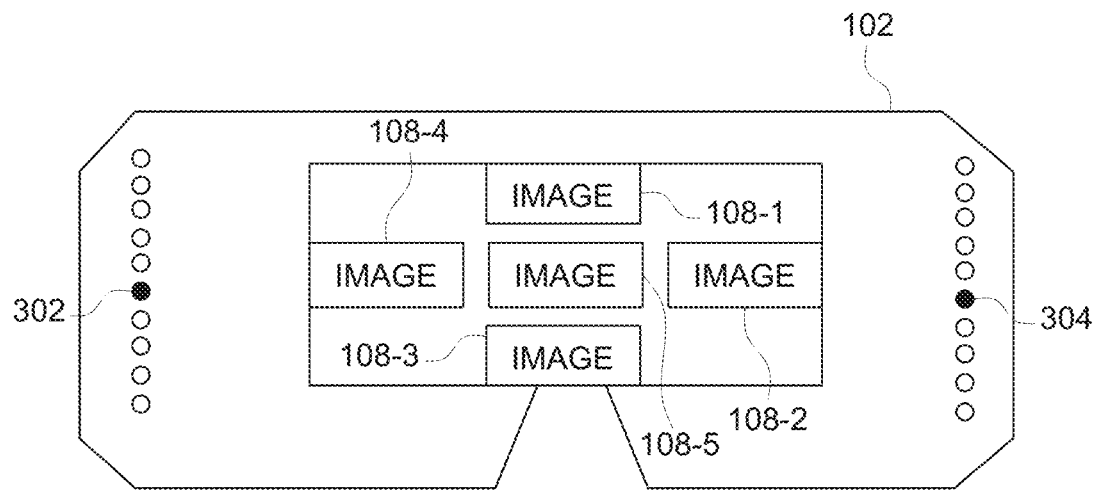
FIGS. 13-18 depict simplified representations of example display devices having multiple display regions and the first and second visual cues.
Figure 14:
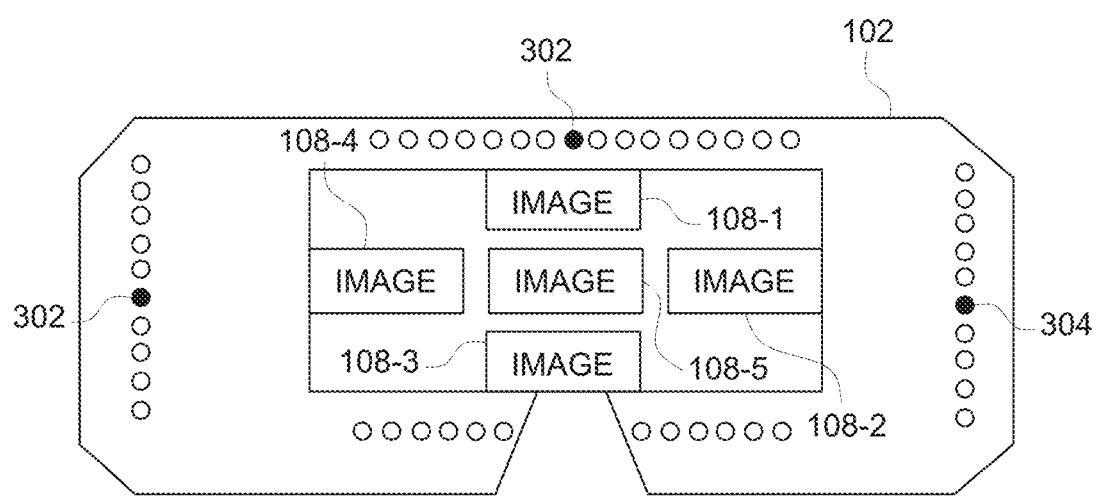
Figure 15:
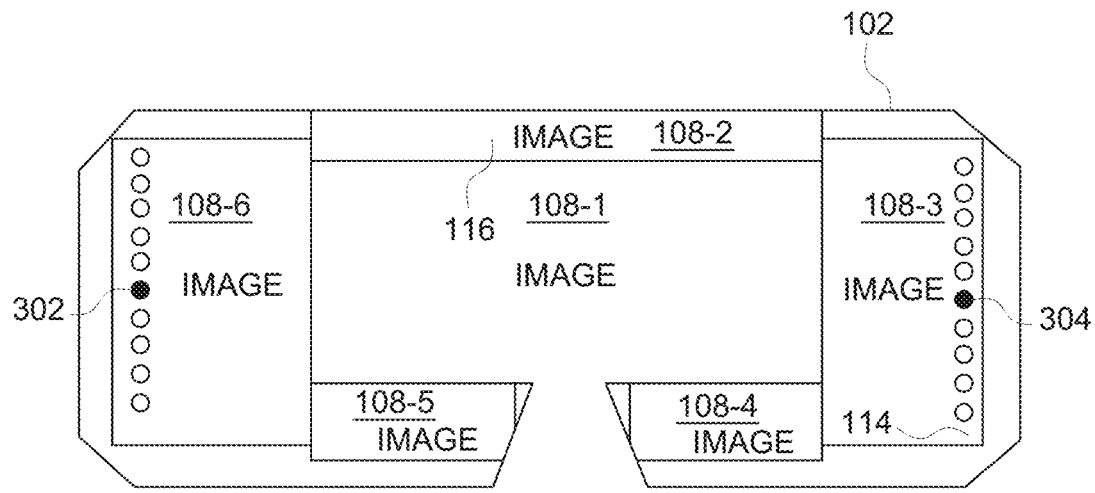
Figure 16:
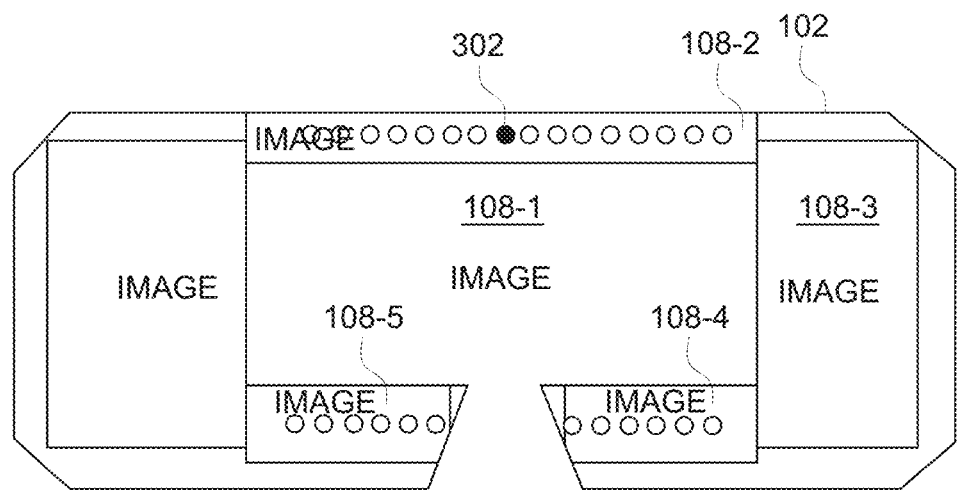
Figure 17:
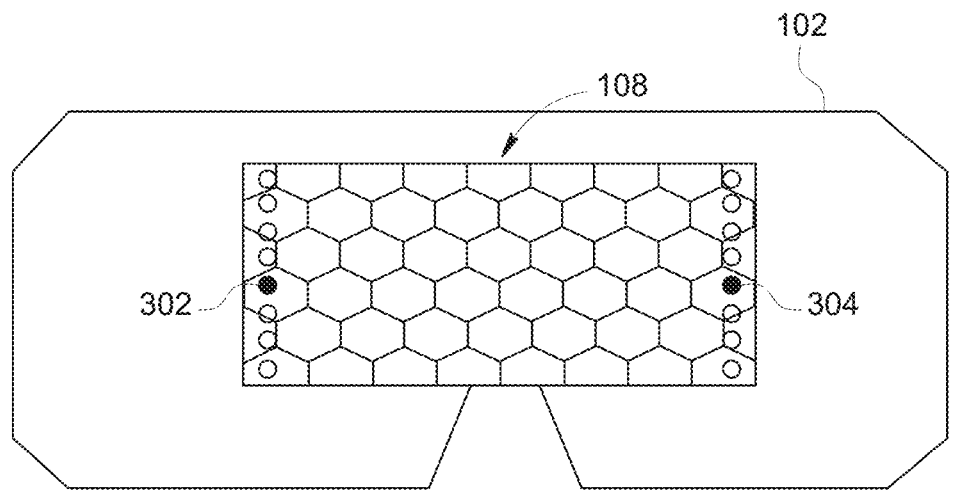
Figure 18:
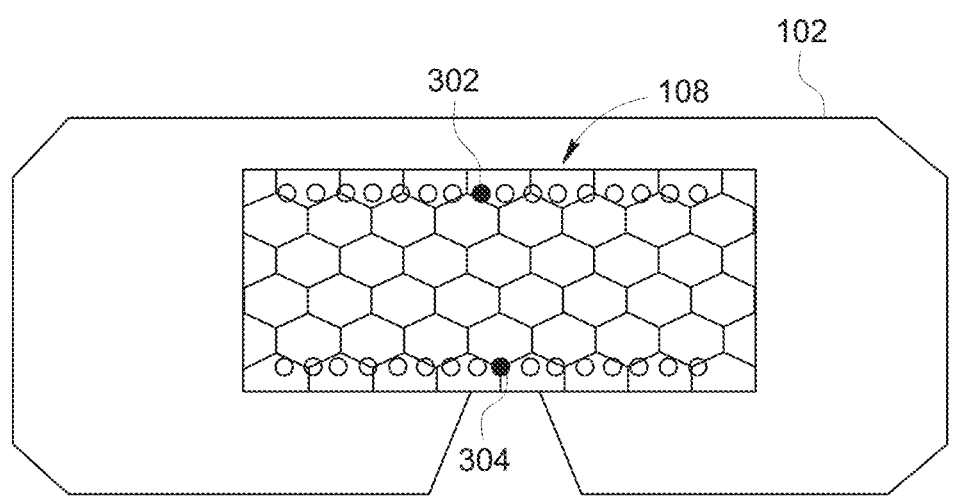

In still other embodiments, the display device 102 may be implemented with multiple display regions 108. In these embodiments, the first and second visual cues 302, 304 may each comprise, for example, a plurality of LEDs that are individually and selectively energized or may be disposed on the display device 102, similar to the embodiments depicted in FIGS. 3-6. Non-limiting examples of these embodiments are depicted in FIGS. 13 and 14, for a display device 102 that includes five display regions 108 (e.g., 108-1, 108-2, 108-3, 108-4, 108-5). In other embodiments, the first and second visual cues 302, 304 may be rendered on a plurality of the multiple display regions 108. Non-limiting examples of these embodiments are depicted in FIGS. 15 and 16, for a display device 102 that includes five display regions 108 (e.g., 108-1, 108-2, 108-3, 108-4, 108-5), and in FIGS. 17 and 18, for a display device 102 that includes multiple hexagonally shaped display regions 108.

Figure 19:
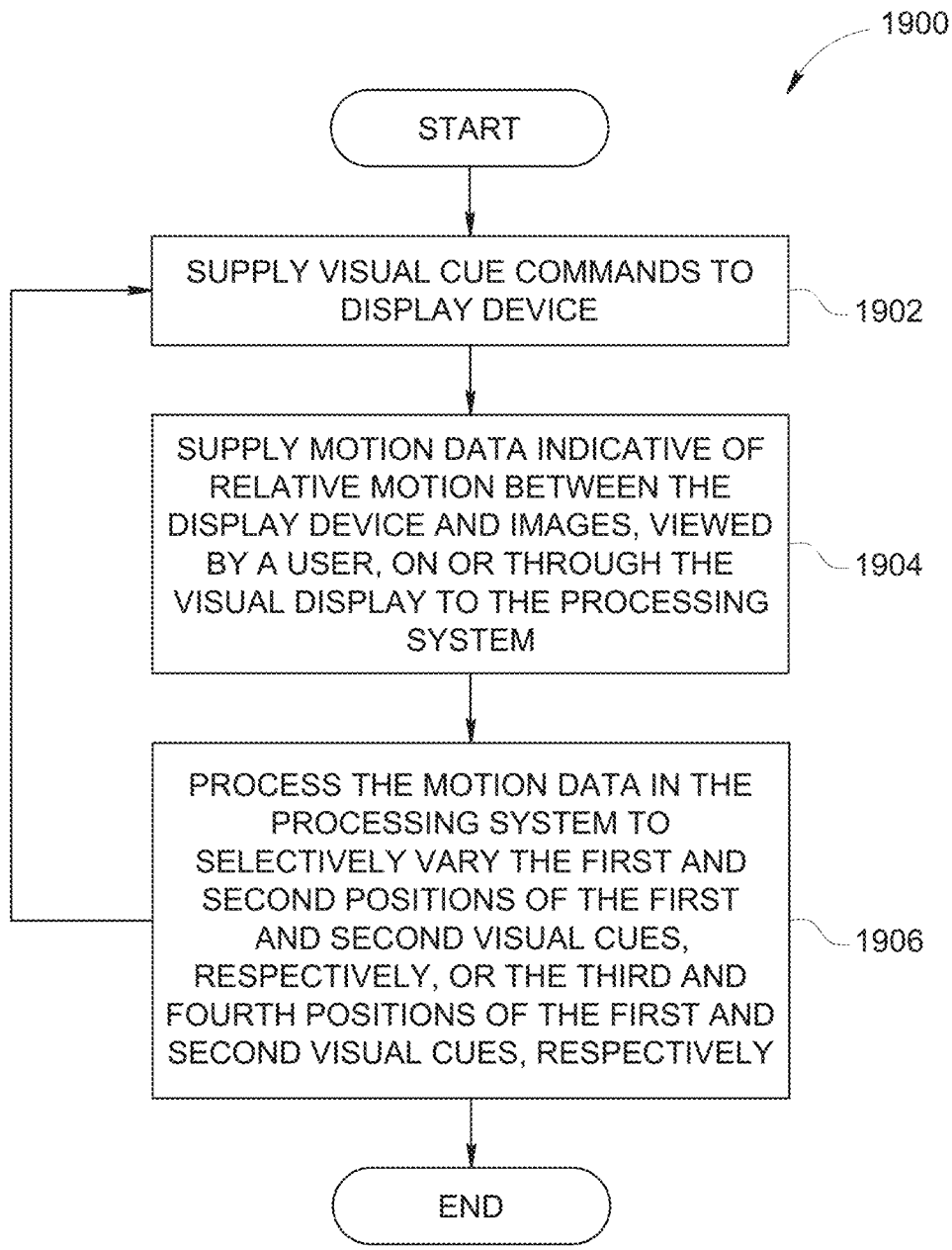
FIG. 19 depicts a process, in flowchart form, that may be implemented in the system of FIG. 1.

Having described the overall functionality of the display system 100, a description of a method for reducing motion sickness that is implemented in display system 100 will now be described. The method 1900, which is depicted in flowchart form in FIG. 19, represents various embodiments of a method for reducing motion sickness. For illustrative purposes, the following description of method 1900 may refer to elements mentioned above in connection with FIGS. 1-18. In practice, portions of method 1900 may be performed by different components of the described display system 100. It should be appreciated that method 1900 may include any number of additional or alternative tasks, the tasks shown in FIG. 19 need not be performed in the illustrated order, and method 1900 may be incorporated into a more comprehensive procedure or method having additional functionality not described in detail herein. Moreover, one or more of the tasks shown in FIG. 19 could be omitted from an embodiment of the method 1900 if the intended overall functionality remains intact.

The method 1900 starts by supplying visual cue commands from the processing system 106 to the display device 102 (1902). As noted above, these visual cue commands cause either (1) only the first visual cue 302 to be generated at a first position on or adjacent to the left peripheral side 112 and only the second visual cue 304 to be generated at a second position on or adjacent to the right peripheral side 114 or (2) only the first visual cue 302 to be generated at a third position on or adjacent to the top peripheral side 116 and only the second visual cue 304 to be generated at a fourth position on or adjacent to the bottom peripheral side 118.

Motion data indicative of relative motion between the display device 102 and images, viewed by a user 120, on or through the display region 108 is supplied to the processing system 106 (1904). The motion data is processed in the processing system 106 to thereby selectively vary either the first and second positions of the first and second visual cues 302, 304, respectively, or the third and fourth positions of the first and second visual cues 302, 304, respectively (1906).

The display system and method disclosed herein reduces the incidence of motion sickness and does not rely on a moving fluid (or other visual cue) to provide a horizon cue on the display, and therefore provides a non-intrusive, natural sense of the position of the horizon.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system, comprising:
a display device including at least one display region, the at least one display region having an outer peripheral region that includes at least a left peripheral side, a right peripheral side, a top peripheral side, a bottom peripheral side; and
a processing system in operable communication with the display device and adapted to receive motion data from a motion data source, the motion data indicative of relative motion between the display device and images, viewed by a user, on or through the at least one display region, the processing system configured to:
supply visual cue commands that cause either (1) only a first visual cue to be generated at a first position on or adjacent to the left peripheral side and only a second visual cue to be generated at a second position on or adjacent to the right peripheral side or (2) only the first visual cue to be generated at a third position on or adjacent to the top peripheral side and only the second visual cue to be generated at a fourth position on or adjacent to the bottom peripheral side; and based on the motion data, selectively vary either (1) the first and second positions of the first and second visual cues, respectively, or the third and fourth positions of the first and second visual cues, respectively.

2. The display system of claim 1, wherein the motion data source comprises one or more of an attitude sensor, a motion sensor, and an acceleration sensor.

3. The display system of claim 1, wherein the first and second visual cues are rendered on the left peripheral side and right peripheral side, respectively, or on the top peripheral side and the bottom peripheral side, respectively.

4. The display system of claim 3, wherein the first and second visual cues each comprise a single graphic.

5. The display system of claim 3, wherein the first and second visual cues each comprise a multi-colored stripe.

6. The display system of claim 1, wherein the first and second visual cues are disposed on the display device adjacent to either (1) the left peripheral side and right peripheral side, respectively, or (2) the top peripheral side and the bottom peripheral side, respectively.

7. The display system of claim 6, wherein the first and second visual cues each comprise a plurality of LEDs that are individually and selectively energized.

8. The display system of claim 1, wherein:
the processing system is further configured to selectively supply image rendering display commands to the display device; and
the display device is configured, upon receipt of the image rendering display commands, to render one or more images in the at least one display region.

9. A display system, comprising:
a display device including at least one display region, the at least one display region having an outer peripheral region that includes at least a left peripheral side, a right peripheral side, a top peripheral side, a bottom peripheral side;
a motion data source configured to (i) sense relative motion between the display device and images, viewed by a user, on or through the at least one display region and (ii) supply motion data indicative of the relative motion; and
a processing system in operable communication with the display device and the motion data source, the processing system configured to:
supply visual cue commands that cause either (1) only a first visual cue to be generated at a first position on or adjacent to the left peripheral side and only a second visual cue to be generated at a second position on or adjacent to the right peripheral side or (2) only the first visual cue to be generated at a third position on or adjacent to the top peripheral side and only the second visual cue to be generated at a fourth position on or adjacent to the bottom peripheral side; and
based on the motion data, selectively vary either (1) the first and second positions of the first and second visual cues, respectively, or the third and fourth positions of the first and second visual cues, respectively.

10. The display system of claim 9, wherein the motion data source comprises one or more of an attitude sensor, a motion sensor, and an acceleration sensor.

11. The display system of claim 9, wherein the first and second visual cues are rendered on the left peripheral side and right peripheral side, respectively, or on the top peripheral side and the bottom peripheral side, respectively.

12. The display system of claim 11, wherein the first and second visual cues each comprise a single graphic.

13. The display system of claim 11, wherein the first and second visual cues each comprise a multi-colored stripe.

14. The display system of claim 9, wherein the first and second visual cues are disposed on the display device adjacent to either (1) the left peripheral side and right peripheral side, respectively, or (2) the top peripheral side and the bottom peripheral side, respectively.

15. The display system of claim 14, wherein the first and second visual cues each comprise a plurality of LEDs that are individually and selectively energized.

16. The display system of claim 9, wherein:
the processing system is further configured to selectively supply image rendering display commands to the display device; and
the display device is configured, upon receipt of the image rendering display commands, to render one or more images in the at least one display region.

17. A method for reducing motion sickness using a display system that includes a display device having at least one display region that includes an outer peripheral region, the outer peripheral region including at least a left peripheral side, a right peripheral side, a top peripheral side, a bottom peripheral side, the method comprising the steps of:
supplying, from a processing system, visual cue commands that cause either (1) only a first visual cue to be generated at a first position on or adjacent to the left peripheral side and only a second visual cue to be generated at a second position on or adjacent to the right peripheral side or (2) only the first visual cue to be generated at a third position on or adjacent to the top peripheral side and only the second visual cue to be generated at a fourth position on or adjacent to the bottom peripheral side;
supplying, to the processing system, motion data indicative of relative motion between the display device and images, viewed by a user, on or through the at least one display region; and
processing the motion data in the processing system to thereby selectively vary either the first and second positions of the first and second visual cues, respectively, or the third and fourth positions of the first and second visual cues, respectively.

18. The method of claim 17, further comprising:
supplying the motion data from one or more of an attitude sensor, a motion sensor, and an acceleration sensor.

19. The method of claim 17, wherein the first and second visual cues are rendered on the left peripheral side and right peripheral side, respectively, or on the top peripheral side and the bottom peripheral side, respectively.

20. The method of claim 17, wherein the first and second visual cues are disposed on the display device adjacent to either (1) the left peripheral side and right peripheral side, respectively, or (2) the top peripheral side and the bottom peripheral side, respectively.

\* \* \* \* \*